United States Patent [19]

Forker, Jr. et al.

[11] Patent Number: 4,483,700

[45] Date of Patent: Nov. 20, 1984

[54] CHEMICAL STRENGTHENING METHOD

[75] Inventors: Ray B. Forker, Jr., Beaver Dams; Joseph N. Panzarino, Corning, both of N.Y.

[73] Assignee: Corning Glass Works, Corning, N.Y.

[21] Appl. No.: 523,088

[22] Filed: Aug. 15, 1983

[51] Int. Cl.³ .............................................. C03C 21/00
[52] U.S. Cl. ...................................... 65/30.14; 65/29
[58] Field of Search ...................... 65/29, 30.14, 30.13

[56] References Cited

U.S. PATENT DOCUMENTS

| | | | |
|---|---|---|---|
| 3,393,987 | 7/1968 | Plumat | 65/29 |
| 3,751,238 | 8/1973 | Grego et al. | 65/30.14 |
| 4,231,776 | 11/1980 | Trojer | 65/29 |

FOREIGN PATENT DOCUMENTS

| | | | |
|---|---|---|---|
| 144905 | 11/1980 | German Democratic Rep. | 65/30.13 |
| 7210423 | 1/1973 | Netherlands | 65/30.14 |

*Primary Examiner*—Kenneth M. Schor
*Attorney, Agent, or Firm*—C. S. Janes, Jr.

[57] ABSTRACT

A method of chemically strengthening a sodium silicate glass is disclosed wherein ions from the glass are exchanged for larger ions, e.g. $Na^+$ for $K^+$, at a temperature above the glass strain point, subsequently the same exchange is carried out below the glass strain point, and the glass article is maintained throughout the process in a single, temperature-programmed bath containing the large exchangeable ions.

6 Claims, 1 Drawing Figure

CHEMICAL STRENGTHENING METHOD

BACKGROUND OF THE INVENTION

It is well established that a glass article may be strengthed by uniform development of compressive stresses within a surface layer on the article. A technique for developing such stresses, known as chemical strengthening, involves exchange of ions between the glass and an external source.

One method of chemical strengthening by ion exchange is termed a low temperature method because it is normally carried out below the glass strain point. At such temperatures, the glass structure does not rearrange to any substantial degree, and therefore does not release stress to any substantial degree. In this method, relatively large ions, such as potassium or sodium, migrate into a glass and exchange position with smaller ions in the glass, such as sodium or lithium ions. The physical crowding caused by such large-for-small ion exchange creates compressive stresses. These are essentially retained since the glass structure cannot rearrange.

The low temperature method is described in detail in an article entitled: "Strengthening by Ion Exchange", Journal of the American Ceramic Society, pp. 215-219 (1964). The article explains that aluminosilicate or zirconosilicate glasses, that is silicate glasses containing substantial contents of $Al_2O_3$ and/or $ZrO_2$, are uniquely susceptible to such ion exchange. Substantial strength may be retained even after abrasion of these glasses.

The low temperature method is capable of generating relatively large strength values. However, the depth of the exchange, and consequent stress development, tends to be shallow. This can be corrected by longer exchange time, but this expedient also creates a relatively high central tension. That is the force developed in a central zone of the article to balance the compressive forces developed in the surface layer.

A method of coping with this problem is disclosed in U.S. Pat. No. 3,751,238 (Grego et al.). The depth of ion exchange below a glass surface within a given time is substantially increased, while maintaining a relatively low level of central tension in the article. The method comprises (1) contacting the surface of a sodium silicate glass article with potassium ions to create a potassium enriched surface layer by exchange of potassium ions for sodium ions, (2) heating the article at a temperature above the glass strain point for at least five minutes to cause molecular rearrangement in the glass to accommodate the potassium ions and release any compressive stress, and (3) contacting the glass surface with potassium ions at a temperature over 200° C., but below the glass strain point. Ion exchange occurs at two levels. This results in a deeper level of ion exchange being attained while maintaining a moderate central tension and adequately high surface strength. Preferably, the first contacting and the heating steps are combined and may extend for a period of hours.

For many purposes, the improvements provided in accordance with the Grego et al. method were quite satisfactory. However, difficulty was encountered in attempting to strengthen sheet glass for vehicle windows. For this purpose, certain rather severe conditions are prescribed.

For test purposes, 6" or 12" squares are commonly employed for fracture pattern study and/or stone damage. However, the actual size of a vehicle side window is 12"×36". We found this could make a critical difference. Thus, a test piece might appear to provide properties within a specification, whereas the full size product would fail.

Specifications not only vary from country to country, but also may undergo intrinsic change. For example, a recent European specification prescribed that 5 out of 6 samples must pass a ball drop test in which a 227 gram ball is dropped on a sample from a height of two meters. In a further test, a window is broken by impact with a 75 gram hammer having a point radius of 0.2 mm, and examined after a ten minute delay. The number of shards in a 6 cm square area (outside a defined impact area) should be between 40 and 350 in number with none larger than 3 $cm^2$. At the same time, a United States specification has prescribed that 10 of 12 samples, each one foot square, must survive a half pound ball being dropped from ten feet. While shard size was not prescribed, no fragment more than 0.15 oz. was permitted after breakage by ball drop. Also, survival of impact by an 11 lb. sand bag from 8 feet was required.

To attain these levels, a depth of layer over ten mils, and preferably over 15 mils, was considered necessary; also a low central tension of no more than 5 $kg/mm^2$, and preferably 3-4, with a surface compression of at least 30,000 psi.

PURPOSE OF THE INVENTION

A basic purpose is to provide a method of producing glass sheet for vehicle windows that will meet the specifications for such articles.

Another purpose is to provide an improved method of strengthening glass ware by a modified low temperature method.

A further purpose is to provide an improvement in the chemical strengthening method disclosed in Grego et al.—238.

A particular purpose is to enhance the depth of layer (DOL) value in a strengthened glass article without unduly increasing the central tension.

A further particular purpose is to enhance the strength characteristics in a strengthened glass article without risking surface crazing.

Another particular purpose is to reduce the cost and time required to achieve prescribed strength characteristics in a glass sheet.

SUMMARY OF THE INVENTION

The invention resides in a method of chemically strengthening a glass article containing sodium and/or lithium ions by contacting the glass with a source of larger exchangeable ions, such as potassium ions, while the glass is at a temperature above its strain point, subsequently contacting the glass with a source of such exchangeable ions while the glass is at a temperature below its strain point, and maintaining the glass in a single, temperature-controlled bath containing exchangeable ions throughout the ion exchange process. Preferably the glass is a sodium silicate glass containing a substantial amount of alumina and/or zirconia; the contacting means is a molten salt bath; the high temperature treatment is below 800° C. and the low temperature is above 200° C.; and the complete treatment is carried out in one bath without the article being removed.

PRIOR LITERATURE

In addition to literature already discussed, and additional literature cited therein, two further United States Patents may be of interest.

U.S. Pat. No. 3,524,373 (Doyle et al.) discloses a chemical strengthening method wherein a sodium aluminosilicate glass is heated in air at a temperature near the glass strain point, preferably 5°–35° C. above, and thereafter contacted with a potassium ion source at a temperature 50°–150° C. below the glass strain point.

U.S. Pat. No. 3,395,998 (Olcott) describes a chemical strengthening method wherein an alkali metal silicate glass is subjected to an exchange of lithium ions ($Li^+$), from an external source, for sodium ions ($Na^+$), from the glass, the exchange being at a temperature above the glass strain point. The glass is then cooled below the strain point and heated in air at such lower temperature to effect an exchange of $Na^+$ for $Li^+$ within the glass.

DESCRIPTION OF THE DRAWING

The single FIGURE in the drawing is a generalized graphical illustration of the stress condition existing in a hypothetical piece of glass after each of the two ion exchange treatments in accordance with the invention.

GENERAL DESCRIPTION OF THE INVENTION

Figure 1:
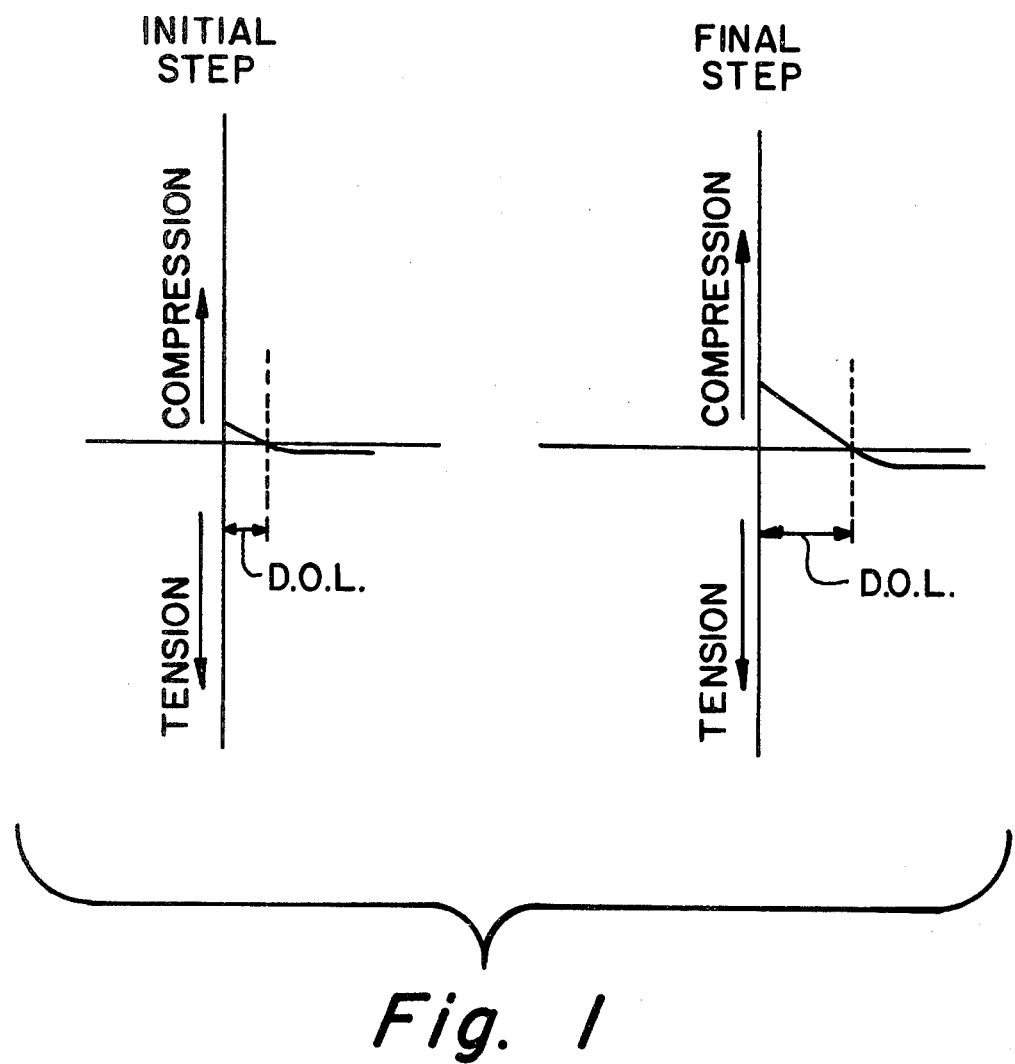

The present invention may be considered as either an improvement over, or a departure from, the method disclosed in the Grego et al.—238 patent. Accordingly, the disclosure of that patent is incorporated in its entirety for reference.

Briefly, the method of the patent involves an initial ion exchange in the glass accompanied, or followed, by heat treatment above the glass strain point. The ion exchange is between large ions from an external source and sodium and/or lithium ions from the glass. Usually, the process employs a molten salt bath whereby the ion exchange and heat treatment may be coincident. While the patent contemplates a separate heat treatment, that is not contemplated in the present method.

Once the initial treatment is completed, the patent contemplates removing the article from the bath, or other exchangeable ion source, and cooling, cleaning and inspecting it. The article is then subjected to a second exchange of larger for smaller alkali metal ions, this time at a temperature below the glass strain point.

In the initial step, heating the glass above its strain point allows the glass structure to reorganize to a large extent. This in turn tends to relieve crowding as the large ion replaces a smaller sodium or lithium ion in the ion exchange. As a result, only low stresses remain in the glass. The purpose of this step then is to position larger ions within the glass for future action.

The stress condition developed by this initial step is shown in the generalized graphical illustration in that portion of the accompanying drawing labeled "Initial Step". The right hand side of the x-axis represents depth within the glass, while values above this axis represent compression and values below represent tension.

During the second ion exchange step, the temperature is now below the glass strain point. As a consequence, crowding does occur as ion exchange proceeds, and, lacking glass rearrangement, compression stresses do develop. However, they not only develop within the glass surface in the normal manner, but also develop deeper as the original larger ions now migrate deeper in the glass.

The condition that prevails after this step is shown in the generalized graphical illustration of the accompanying drawing that is labeled "Final Step". This corresponds to the illustration of the "Initial Step", but shows a substantially deeper distribution of compressive stress, a consequently deeper layer (DOL) and a relatively low central tension.

It will be appreciated that reference has been to a source of exchangeable ions larger than lithium and/or sodium ions in the glass. This is the basic requirement of the so-called large-for-small-ion form of low temperature chemical strengthening. Any larger exchangeable ion is contemplated, and such examples as cesium, rubidium, thallium and the like have been successfully used. However, exchange times tend to be markedly longer, and the materials required tend to be expensive and in short supply. Therefore, it is customary to employ potassium salt mixtures as molten baths with potassium being the larger exchangeable ion. Such will be the practice in the further description.

The characteristic feature of the present invention is employment of a single, temperature-programmed bath of molten salt for the ion exchange process. The bath itself, and the salt mixture used therein, are chosen to provide a temperature above the glass strain point. Then the bath is designed to be quickly and easily reduced in temperature to a lower temperature below the glass strain point.

The glass article being treated may be heated in conjunction with the bath. Alternately, it may be immersed in a preheated bath and held at a prescribed temperature above the glass strain point for a predetermined time. During this time, large ions, such as potassium, enter the glass in exchange for smaller ions from the glass. However, no stress develops since the glass structure rearranges to accommodate the larger ions.

Following this high temperature treatment, the bath temperature is programmed down to a preselected lower exchange temperature below the glass strain point. At this temperature, as well as during the temperature change, the ion exchange continues uninterrupted. This occurs because the glass is maintained in the molten salt bath throughout, and is not removed or cooled below the lower exchange temperature.

The change that does occur is that the glass has gradually become unable to rearrange structure at the new temperature. Hence, it now supports stresses that develop as ions continue to exchange both at the surface and within the glass. It is apparent that ion exchange is a continuing process in our method. There is no cooling and reheating during which exchange kinetics are disrupted. Rather, as the changeover to the lower temperature occurs, there is a smooth transition to a somewhat slower exchange rate, but no interruption of ion exchange.

We feel that maintaining continuity in the ion exchange is important. Avoiding air contact between steps may also be beneficial. It is even possible that surface defects may be caused, or aggravated, by cooling and reheating in contact with adherent salt. Regardless of cause and effect, however, we have observed various advantages arising from our continuous exchange process.

In the area of strengthening, per se, no substantial advantage, in terms of total measurable stress developed, is apparent. Rather, the major advantage appears in ability to control pattern or distribution, and thereby achieve better consistency. Thus, it has been found possible to consistently meet certain breakage pattern and shard size conditions that, previously, were met only erratically.

Surface condition of the finished product is of course most important, especially optical clarity. The erratic occurrence of crazing and similar surface defects makes it difficult to pinpoint the source. However, the significant fact is that we now consistently avoid the problem.

Another advantage arises in operating time and cost. Being a continuous process, the time spent in cooling and reheating is conserved. This not only conserves energy, but also saves wear and tear on equipment due to large temperature changes.

Any source of exchangeable potassium ion that is stable at the temperature involved may be employed. We have found an eutectic molten salt bath composed of 52% potassium chloride (KCl) and 48% potassium sulfate ($K_2SO_4$) quite suitable. This salt mixture is maintained in a programmed container where temperature can be quickly and readily changed. This avoids delay in switching the bath, and glass maintained therein, to the lower temperature of the second step.

To facilitate the temperature change, it is convenient to avoid temperature extremes, although temperatures up to 800° C. are contemplated for the first step and as low as 200° C. for the second. We prefer to carry out the first exchange at about 15°–20° C. above the glass strain point, say 600° C., for up to five (5) hours. The temperature may then be lowered to about 50°–75° C. below the strain point, say 535° C. The hold time depends on strength conditions desired, usually several hours at least.

Specific Embodiments

A soda-alumina-silica glass having a composition, as calculated on the oxide basis in percent by weight, of 61.2% $SiO_2$, 17.0% $Al_2O_3$, 12.9% $Na_2O$, 3.4% $K_2O$, 3.5% MgO, 0.4% CaO, 0.8% $TiO_2$ and 0.8% $As_2O_3$, was melted to provide glass for present studies. A portion of the melt was rolled to form sheet glass of three thicknesses, 0.070", 0.085", and 0.105". The rolled sheets were cut into 12"×12" squares for impact testing and 12"×36" sheets for center punch testing.

Samples of each glass thickness were subjected to an ion exchange treatment in accordance with the present invention. The samples were immersed in a temperature programmed salt bath composed of 85% $KNO_3$ and 15% $K_2SO_4$. The bath was operating at 600° C. and was held at that temperature for five (5) hours with the glass samples immersed. The strain point for this glass is 581° C.

At the conclusion of the five hour treatment, the bath temperature was lowered to 520° C. while the samples remained immersed in the bath. The bath was then held at 520° C. for seventeen (17) hours. After this, the samples were removed, cleaned and tested for stress development and fracture characteristics. The data measured showed:

Depth of Layer (DOL) =0.015"
Center Tension (CT) =4.4 kg/mm$^2$
Shards After Impact Fracture
 0.105" glass =3–4" max.
 0.070" glass =2–3" max.
Ball Impact Fracture
 0.105" glass =10–14'
 0.070" glass =5–6'

The samples were clear, and free of any crazing or other surface defects. In contrast, samples treated in identical manner, but cooled between ion exchange steps, were found to have crazing on their surface.

A comparison of single versus two-step treatment was made to illustrate the time conserved by the latter. A sample of glass was immersed as above for four (4) hours at 600° C. Thereafter, the bath was programmed down to 520° C. without disturbing the sample. After ten (10) hours at this temperature, the sample was removed, cooled and cleaned. It was observed to have a clear surface and a DOL of 12.7 mils. Subsequent tests were made with samples being given a single ion exchange treatment at 535° C. for varying times. It was found necessary to treat for 25 hours to obtain a depth of 12.7 mils, whereas only 14 was required in the two step process.

By way of further illustrating the superiority of a two-step process, as well as showing the variable stress conditions obtainable without glass surface deterioration, reference is made to TABLES 1 and 2 below. These TABLES present data measured on samples given a variety of treatments as indicated.

In one case, each panel was immersed in a molten bath at 535° C. and maintained for an extended time at that temperature. TABLE 1 shows the time in hours (hrs.), the glass thickness in mils, the central tension (CT) in kg/mm$^2$, the depth of layer (DOL) in mils and surface compression (SC) in kg/mm$^2$.

TABLE 1

| Time | Thickness | CT | DOL | SC |
|---|---|---|---|---|
| 18 | 0.070 | 6.59 | 10.7 | 30.5 |
|  | 0.085 | 5.75 | 10.7 | 33.0 |
|  | 0.105 | 4.56 | 10.7 | 33.2 |
| 25 | 0.070 | 7.60 | 12.7 | 29.7 |
|  | 0.085 | 6.59 | 12.7 | 29.6 |
|  | 0.105 | 5.24 | 12.7 | 31.4 |

In a second set, each panel was immersed in a molten salt bath identical in composition to that used before but programmable in temperature. Each panel was immersed for four hours at 600° C., and then kept in the bath while temperature was reduced to 535° C. TABLE 2 shows the hold time at 535° C. and data measured as before.

TABLE 2

| Time | Thickness | CT | DOL | SC |
|---|---|---|---|---|
| 12 | 0.070 | 5.24 | 14.6 | 12.6 |
|  | 0.085 | 4.73 | 14.6 | 14.9 |
|  | 0.105 | 3.97 | 14.6 | 15.3 |
| 16 | 0.070 | 6.59 | 15.2 | 17.5 |
|  | 0.085 | 5.91 | 15.2 | 18.3 |
|  | 0.105 | 4.81 | 15.2 | 19.7 |

The greater depth and lower central tension obtained in shorter time is apparent.

In an optimized schedule, panels of varying thickness were immersed as above in a molten salt bath at 600° C. After holding five hours, the temperature was reduced to 520° C. and held 17½ hours. The panels were held in the bath throughout the treatment. The results were as follows:

TABLE 3

| Thickness | CT | DOL | SC |
|---|---|---|---|
| 0.070 | 6.25 | 16.0 | 15 |
| 0.085 | 5.75 | 16.0 | 16.3 |
| 0.105 | 4.56 | 16.0 | 18.6 |

The panels were then tested for impact resistance and found to break at 8 to 11 feet with ½ lb. ball impact. Shards were on the order of 3" or less thus being satisfactory. Finally, a set of panels was subjected to a stone impact test and no panel broke below 17 feet.

In all cases, the panels, due to their freedom from exposure during ion exchange, were clear and free from surface defects. It is apparent that properties improve with increased glass thickness, but that this increases product weight also. Accordingly, glass thickness of 80 to 100 mils, preferably 85 mils, appears to be a good compromise.

I claim:

1. In a method of chemically strengthening a sodium silicate glass article by ion exchange wherein the glass article is contacted with a source of exchangeable ions larger than sodium ions at a temperature above the glass strain point and for a time sufficient to replace sodium ions without causing a compressive stress in the article, and subsequently further contacted with said source of exchangeable larger ions at a temperature below the glass strain point for a time sufficient to replace sodium ions and provide a compressive stress in the article surface, an improvement whereby the glass is maintained throughout the process in a single, temperature-programmed bath containing said source of exchangeable larger ions, the glass article not being removed from the bath between the contacting and further contacting stages of the process.

2. The method of claim 1 wherein the larger exchangeable ions are potassium ions.

3. The method of claim 2 wherein the source of larger exchangeable ions is a salt bath composed of a mixture of potassium salts.

4. The method of claim 1 wherein the initial contacting is below 800° C. and the second contacting is above 200° C.

5. The method of claim 1 wherein the glass is a soda alumino-silicate glass.

6. The method of claim 5 wherein the glass is initially contacted for one to five hours at about 600° C., and subsequently contacted at about 520° C. for 16 to 24 hours.

* * * * *